United States Patent
Muzik et al.

(10) Patent No.: US 11,113,340 B2
(45) Date of Patent: Sep. 7, 2021

(54) DATA GENERATION AND CERTIFICATION

(71) Applicant: JPMorgan Chase Bank, N.A., New York, NY (US)

(72) Inventors: Kristin Muzik, Kennett Square, PA (US); Pallavi Mate, Chadds Ford, PA (US); Gayatri Khambadkone, Chadds Ford, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 416 days.

(21) Appl. No.: 16/230,229

(22) Filed: Dec. 21, 2018

(65) Prior Publication Data

US 2020/0201906 A1 Jun. 25, 2020

(51) Int. Cl.
*G06F 16/907* (2019.01)
*G06N 5/02* (2006.01)

(52) U.S. Cl.
CPC ......... *G06F 16/907* (2019.01); *G06N 5/022* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 2012/0254053 A1* | 10/2012 | Joa | G06F 16/215 705/319 |
| 2018/0173733 A1* | 6/2018 | Nath | G06N 5/025 |
| 2019/0188294 A1* | 6/2019 | Mackenthun | G06F 16/2291 |

OTHER PUBLICATIONS

Aljumaili, Mustafa et al., "Metadata-based Data Quality Assessment", VINE Journal of Information and Knowledge Management Systems, vol. 46, Issue 2, pp. 232-250. (Year: 2016).*
Vassiliadis, Panos, "Data Warehouse Modeling and Quality Issues", Ph.D. Thesis, National Technical University of Athens, Jun. 2000, 129 pages. (Year: 2000).*
Piprani, Baba & Ernst, Denise, "A Model for Data Quality Assessment", Springer, OTM 2008 Workshops, LNCS 5333, pp. 750-759. (Year: 2008).*

* cited by examiner

*Primary Examiner* — Scott A. Waldron
(74) *Attorney, Agent, or Firm* — Greenblum & Bernstein, P.L.C.

(57) ABSTRACT

Various methods, apparatuses, and media for facilitating data generation based on a set of metadata are provided. The methodology includes operations of receiving a first input that relates to data attributes and corresponding data attribute descriptions; receiving a second input that relates to applicable data quality rules; using the received inputs to generate a set of metadata; and using the generated set of metadata to generate new data that is compatible with the data quality rules. The data quality rules may be used to determine certification metrics that are used to analyze the newly generated data, in order to ensure a result that has a high level of data quality.

6 Claims, 4 Drawing Sheets

DATA GENERATION AND CERTIFICATION

BACKGROUND

1. Field of the Disclosure

This technology generally relates to facilitating generation and certification of data, and, more particularly, to methods and apparatuses for using metadata to generate data and to test data quality.

2. Background Information

An entity may accumulate data in the course of routine business. The data may be stored in a repository, such as a database or a data warehouse. The stored data may be retrieved by interested parties as needed in the furtherance of the business objectives of the entity.

In many cases, it is desired that the data to be retrieved be presented in the form of a report that includes selected types of data, and that the data be presented in a particular format. A difficulty may arise when the amount of data stored in the repository is large, because it may be time consuming to distinguish which data is desired for a particular report. A further difficulty may arise when different report formats are desired by different users within the entity, because each separate report may require a separate generation process.

SUMMARY

The present disclosure, through one or more of its various aspects, embodiments, and/or specific features or sub-components, provides, inter alia, various systems, servers, devices, methods, media, programs, and platforms for facilitating data generation. The various aspects, embodiments, features, and/or sub-components provide optimized processes of facilitating data generation based on building a metadata set and applying data quality rules to ensure consistency and compliance with user and/or organizational requirements.

According to an aspect of the present disclosure, a method for facilitating data generation is provided. The method includes receiving, via a user interface provided on a display of an electronic device, a first input that relates to at least one data attribute and at least one corresponding data attribute description; receiving, via the user interface, a second input that relates to at least one data quality rule; using the received first input and the received second input to generate a set of metadata; and using the generated set of metadata to generate new data that is compatible with the at least one data quality rule.

The method may further include using the at least one data quality rule to determine at least one certification metric, and using the at least one certification metric to test the new data in order to determine whether the new data is compatible with the at least one data quality rule.

The method may further include using the at least one certification metric to measure a degree of data quality with respect to the at least one data quality rule.

The method may further include updating the generated set of metadata based on the new data.

The method may further include using the generated set of metadata to harvest the new data from a database.

The method may further include filtering data included in the database by comparing an attribute of a particular item of data included in the database with a corresponding subset of the generated set of metadata and determining, based on a result of the comparing, whether the particular item of data is to be included within the new data.

The method may further include receiving a third input that relates to at least one data modeling attribute.

According to another aspect of the present disclosure, a computer device configured to provide a user interface for facilitating data generation is provided. The computer device includes a processor that is communicatively coupled to at least one server device via a network; a display configured to display the user interface; and at least one user input mechanism configured to receive a user input. The processor is configured to: receive a first input that relates to at least one data attribute and at least one corresponding data attribute description; receive a second input that relates to at least one data quality rule; use the received first input and the received second input to generate a set of metadata; and use the generated set of metadata to generate new data that is compatible with the at least one data quality rule.

The processor may be further configured to use the at least one data quality rule to determine at least one certification metric, and to use the at least one certification metric to test the new data in order to determine whether the new data is compatible with the at least one data quality rule.

The processor may be further configured to use the at least one certification metric to measure a degree of data quality with respect to the at least one data quality rule.

The processor may be further configured to update the generated set of metadata based on the new data.

The processor may be further configured to use the generated set of metadata to harvest the new data from a database.

The processor may be further configured to filter data included in the database by comparing an attribute of a particular item of data included in the database with a corresponding subset of the generated set of metadata and determining, based on a result of the comparing, whether the particular item of data is to be included within the new data.

The processor may be further configured to receive a third input that relates to at least one data modeling attribute.

According to yet another aspect of the present disclosure, a non-transitory computer readable medium configured to store instructions for implementing a method for facilitating data generation is provided. When executed, the instructions cause a computer to: receive, via a user interface provided on a display of an electronic device, a first input that relates to at least one data attribute and at least one corresponding data attribute description; receive, via the user interface, a second input that relates to at least one data quality rule; use the received first input and the received second input to generate a set of metadata; and use the generated set of metadata to generate new data that is compatible with the at least one data quality rule.

The instructions may further cause the computer to use the at least one data quality rule to determine at least one certification metric, and to use the at least one certification metric to test the new data in order to determine whether the new data is compatible with the at least one data quality rule.

The instructions may further cause the computer to use the at least one certification metric to measure a degree of data quality with respect to the at least one data quality rule.

The instructions may further cause the computer to update the generated set of metadata based on the new data.

The instructions may further cause the computer to use the generated set of metadata to harvest the new data from a database by comparing an attribute of a particular item of data included in the database with a corresponding subset of the generated set of metadata and determining, based on a result of the comparing, whether the particular item of data is to be included within the new data and correctly matches the designed metadata.

The instructions may further cause the computer to receive a third input that relates to at least one data modeling attribute.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
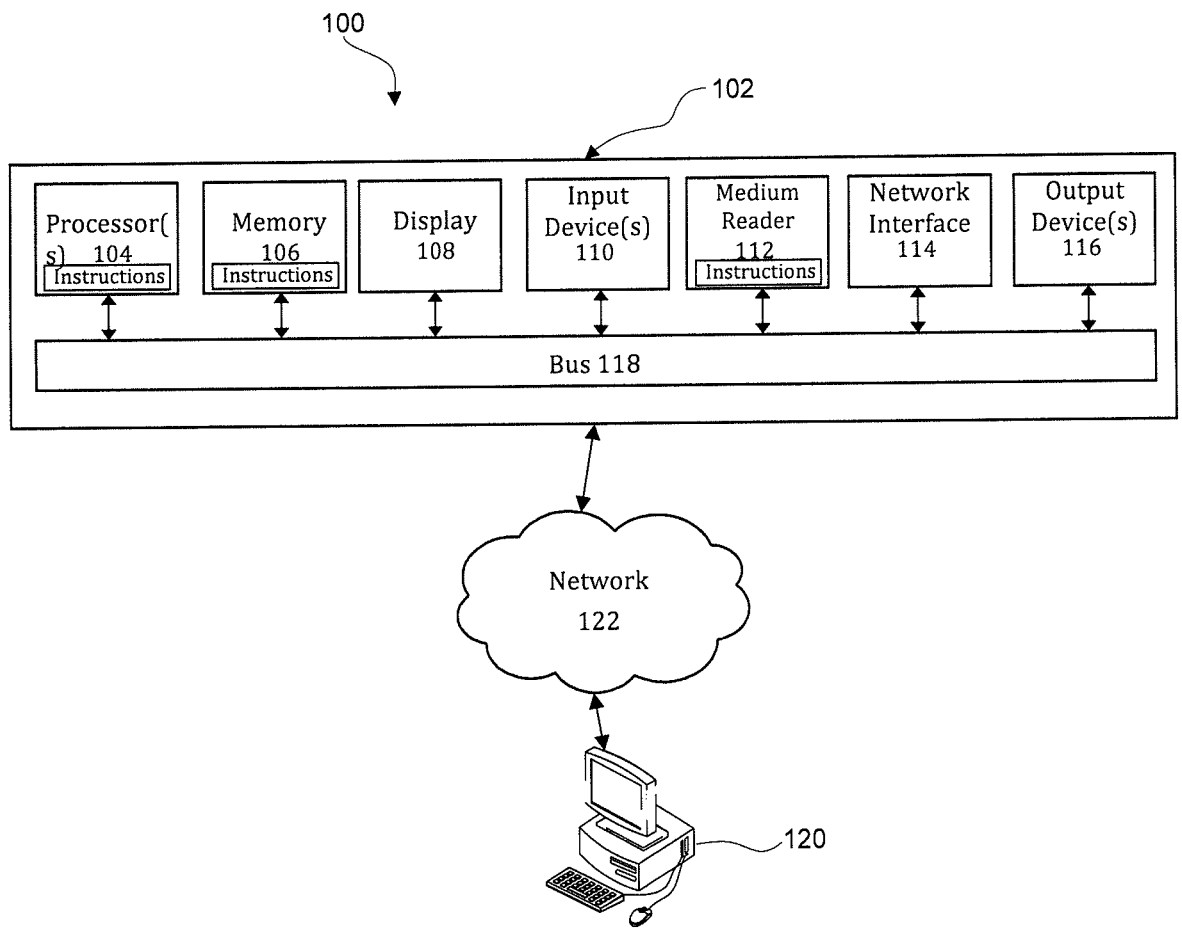
FIG. 1 illustrates an exemplary computer system for facilitating data generation.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
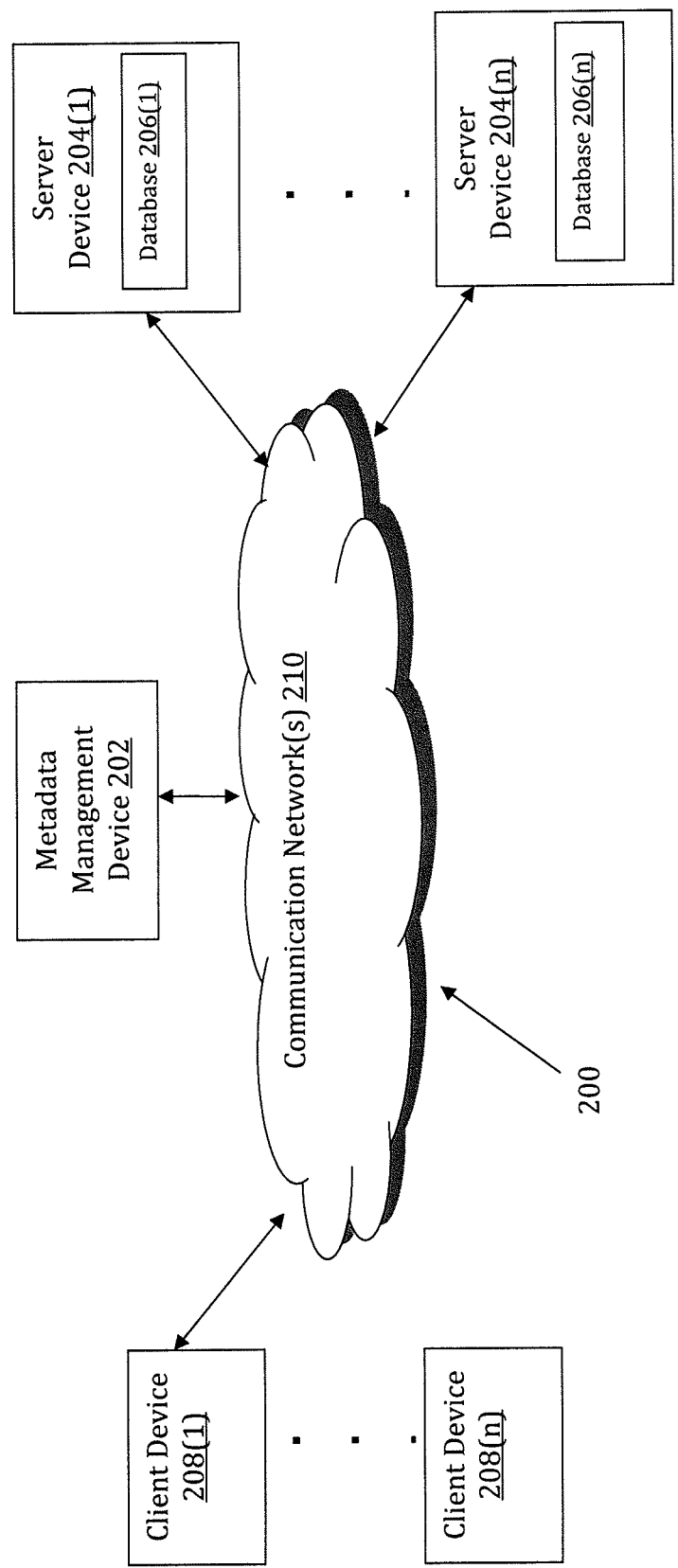
FIG. 2 illustrates an exemplary diagram of a network environment with a metadata management device.

Referring to FIG. 2, a schematic of an exemplary network environment 200 for facilitating data generation based on improved metadata management is illustrated. The data being generated may be, for example, an organizational report that is arranged according to a specific format. While generally described herein as being an organizational report, the data to be generated may be any type of data, such as, for example, a spreadsheet, a tabular listing, or a graphical presentation.

The generation of new data may be facilitated by a Metadata Management (MM) device 202. The MM device 202 may be the same or similar to the computer system 102 as described with respect to FIG. 1. The MM device 202 may store one or more applications that can include executable instructions that, when executed by the MM device 202, cause the MM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MM device 202 itself, may be located in virtual server(s) running in a cloud-based computing environment rather than being tied to one or more specific physical network computing devices. Also, the application(s) may be running in one or more virtual machines (VMs) executing on the MM device 202. Additionally, in one or more embodiments of this technology, virtual machine(s) running on the MM device 202 may be managed or supervised by a hypervisor.

In the network environment 200 of FIG. 2, the MM device 202 is coupled to a plurality of server devices 204(1)-204(n) that hosts a plurality of databases 206(1)-206(n), and also to a plurality of client devices 208(1)-208(n) via communication network(s) 210. A communication interface of the MM device 202, such as the network interface 114 of the computer system 102 of FIG. 1, operatively couples and communicates between the MM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MM devices that efficiently generate and manage metadata in order to automatically facilitate generate new data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MM device 202 may be a standalone device or integrated with one or more other devices or apparatuses, such as one or more of the server devices 204(1)-204(n), for example. In one particular example, the MM device 202 may include or be hosted by one of the server devices 204(1)-204(n), and other arrangements are also possible. Moreover, one or more of the devices of the MM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the generation of price quote requests, such as in response to user interaction with graphical user interfaces for example. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the MM device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MM device 202, the server devices 204(1)-204(n), or the client devices 208(1)-208(n), for example, may be configured to operate as virtual instances on the same physical machine. In other words, one or more of the MM device 202, the server devices 204(1)-204(n), or the client devices 208(1)-208(n) may operate on the same physical device rather than as separate devices communicating through communication network(s) 210. Additionally, there may be more or fewer MM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
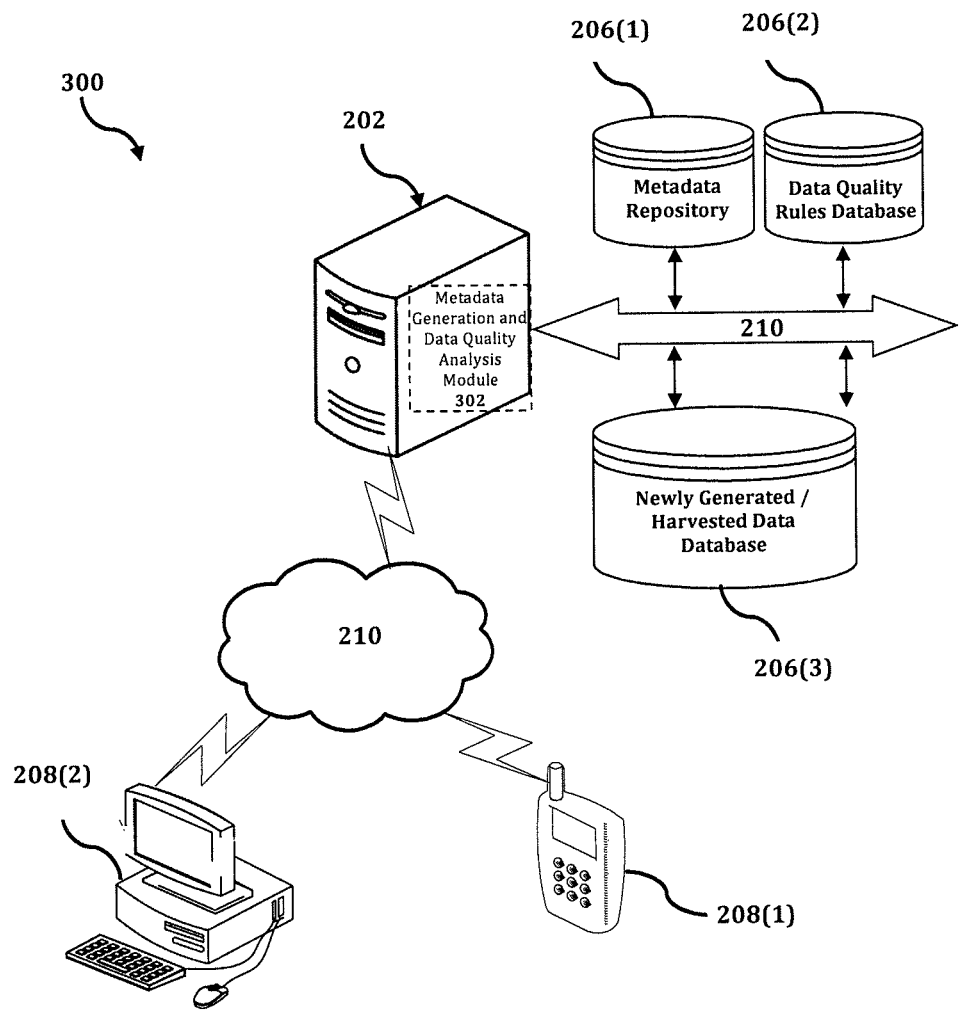
FIG. 3 shows an exemplary system for facilitating data generation based on improved metadata management.

The MM device 202 is described and shown in FIG. 3 as including a metadata generation and data quality analysis module 302, although it may include other rules, policies, modules, databases, or applications, for example. As will be described below, the metadata generation and data quality analysis module 302 is configured to generate metadata sets based on data attributes and requirements and to determine whether newly generated or harvested data complies with applicable quality rules. Based on data attributes and descriptions received from one of client devices 208(1)-208(n), the metadata generation and data quality analysis module 302 generates a set of metadata, and then uses the metadata to generate or harvest new data. The metadata generation and data quality analysis module 302 then uses one or more data quality rules to determine one or more certification metrics, and then uses the certification metric(s) to test the new data in order to determine a quality of the new data.

An exemplary process 300 for generating new data by utilizing the network environment of FIG. 2 is shown as being conducted in FIG. 3. Specifically, a first client device 208(1) and a second client device 208(2) are illustrated as being in communication with MM device 202. In this regard, the first client device 208(1) and the second client device 208(2) may be "clients" of the MM device 202 and are described herein as such. Nevertheless, it is to be known and understood that the first client device 208(1) and/or the second client device 208(2) need not necessarily be "clients" of the MM device 202, or any entity described in association therewith herein. Any additional or alternative relationship may exist between either or both of the first client device 208(1) and the second client device 208(2) and the MM device 202, or no relationship may exist.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MM device 202 via broadband or cellular communication. Of course, these embodiments are merely exemplary and are not limiting or exhaustive.

Upon being started, the metadata generation and data quality analysis module 302 executes a process for facilitating data generation. An exemplary process for facilitating data generation is generally indicated at flowchart 400 in FIG. 4.

Figure 4:
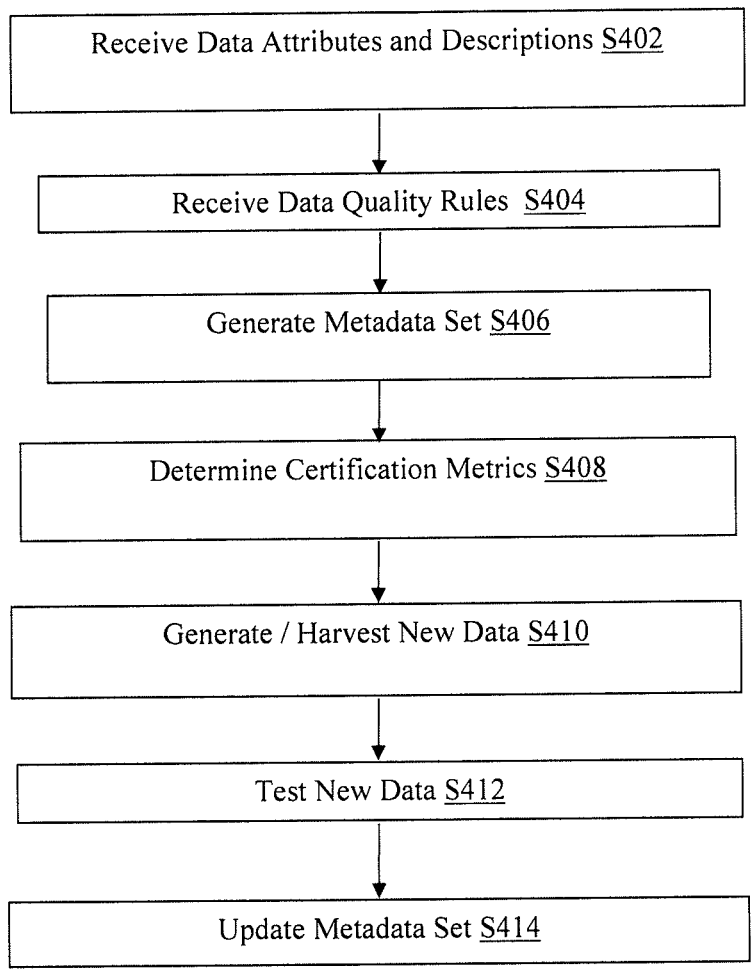
FIG. 4 is a flowchart of an exemplary process for facilitating data generation based on improved metadata management.

In the process 400 of FIG. 4, data attributes and corresponding data attribute descriptions are received at step S402. The data attributes include information that specifies one or more of a type of data, a data identifier, a field length, a range definition, and/or any other type of information that indicates a data attribute and/or a formatting specification. The data attribute descriptions may include any relevant descriptive information.

At least one data quality rule is received at step S404. The data quality rules are provided in order to ensure data quality and accuracy. For example, the data quality rules may include rules that relate to identifying a source of the data, a time at which the data was originally generated, and an update interval with respect to the data.

At step S406, a metadata set is generated. In an exemplary embodiment, the metadata generation and data quality analysis module 302 is configured to use the received data attributes, the corresponding data attribute descriptions, and the received data quality rules to generate a metadata set that is intended to be used for generating a specific type of organizational report.

At step S408, at least one certification metric is determined. In an exemplary embodiment, the metadata generation and data quality analysis module 302 is configured to use the data quality rules to determine certification metrics that are applicable to subsequently generated reports.

At step S410, new data is generated. In an exemplary embodiment, the metadata generation and data quality analysis module 302 is configured to use a particular metadata set as a filter with respect to a data warehouse that stores data from which the applicable report is to be generated. In this aspect, the generation of new data is performed by harvesting the data from the data warehouse.

At step S412, the newly generated data is tested for quality. In an exemplary embodiment, the metadata generation and data quality analysis module 302 is configured to apply the certification metrics to the data that is harvested from the data warehouse in order to determine a quality of the data. The metadata generation and data quality analysis module 302 may be further configured to determine a quality score for each certification metric, and to determine a composite quality score by combining the individual quality scores. The metadata generation and data quality analysis module 302 may be further configured to apply a respective threshold for each metric, and to discard any newly generated data from the resultant set of new data.

At step S414, the metadata set is updated based on the newly generated data. In an exemplary embodiment, metadata generation and data quality analysis module 302 is configured to identify at least one additional data attribute from the newly generated data and to augment the metadata set based on the newly identified data attribute.

The metadata generation and data quality analysis module 302 may be further configured to perform other functions that relate to governance of data generation and enhancements to the metadata repository. In an exemplary embodiment, the metadata generation and data quality analysis module 302 may be further configured to receive input that relates to data modeling attributes, and to update one or more metadata sets based on the data modeling attributes. In another exemplary embodiment, the metadata generation and data quality analysis module 302 may be further configured to receive input that relates to a data registration, i.e., information that indicates an intended recipient and/or an intended destination for a particular report, or other post-generation information that relates to the report.

In an exemplary embodiment, the metadata generation and data quality analysis module 302 may be further configured to interact with one or more of a data owner, a data steward, a data modeler, a developer, a data quality entity, a quality assurance (QA) entity, and a data management and certification (DMC) entity. For example, a data owner may provide a first input that relates to creating a business requirements document, and the metadata generation and data quality analysis module 302 may use the first input to generate metadata to be stored in the metadata repository 206(1). A data steward may provide a second input that relates to creating data elements, and the metadata generation and data quality analysis module 302 may use the second input to generate metadata to be stored in the metadata repository 206(1). A data modeler may provide a third input that relates to creating logical and physical models, and the metadata generation and data quality analysis module 302 may use the third input to generate metadata to be stored in the metadata repository 206(1). A developer may provide a fourth input that relates to importing metadata, such as metadata that relates to a database and/or an extract, transport, and load (ETL) process, and the metadata generation and data quality analysis module 302 may use the fourth input to generate metadata to be stored in the metadata repository 206(1). A data quality entity may provide a fifth input that relates to profile data quality issues and/or report data quality issues, and the metadata generation and data quality analysis module 302 may use the fifth input to generate metadata to be stored in the metadata repository 206(1). A QA entity may provide a sixth input that relates to validating requirements and data flows, and the metadata generation and data quality analysis module 302 may use the sixth input to generate metadata to be stored in the metadata repository 206(1). A DMC entity may provide a seventh input that relates to data certification, and the metadata generation and data quality analysis module 302 may use the seventh input to generate metadata to be stored in the metadata repository 206(1).

In an exemplary embodiment, a user interface is provided to at least one of client devices 208(1)-208(n) to implement the method illustrated in FIG. 4. For example, the user interface may enable a user to request that a specific report be generated by providing input via the user interface. The input may be received by MM device 202, and by executing the method illustrated in FIG. 4, the requested report may generated quickly and efficiently, while ensuring a high degree of data quality.

Accordingly, with this technology, an optimized process for facilitating data generation based on improved metadata management is provided. The optimized process enables a user to quickly and efficiently obtain high-quality data in a desired format by generating metadata sets based on specific data attributes, harvesting data from a data warehouse, and testing the harvested data by applying certification metrics that are derived from data quality rules.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    displaying a user interface on a display of an electronic device, the user interface configured to receive a plurality of inputs;
    receiving, via the user interface, a first input of the plurality of inputs that relates to at least one data attribute and at least one corresponding data attribute description, wherein the at least one data attribute includes information that specifies a type of data, a data identifier, a field length, a range definition, and a formatting specification;
    receiving, via the user interface, a second input of the plurality of inputs that relates to at least one data quality rule, wherein the at least one data quality rule includes a first rule to identify a source of the data, a second rule to identify a time that the data was originally generated, and a third rule to identify an update interval for the data;
    using the received first input and the received second input to generate a set of metadata;
    using the at least one data quality rule to determine a plurality of certification metrics, wherein each of the plurality of certification metrics measures a degree of data quality with respect to the at least one data quality rule;
    filtering data in a data warehouse with at least one subset of the generated set of metadata;
    generating new data from the filtered data, wherein the new data is compatible with the at least one data quality rule;
    determining a quality score for at least one subset of the new data by applying the plurality of certification metrics to the at least one subset of the new data;
    determining a composite quality score for the at least one subset of the new data by combining each of the corresponding plurality of certification metrics;
    discarding the at least one subpart of the new data when the corresponding composite quality score is below a certification metric threshold;
    updating the generated set of metadata based on the undiscarded new data;
    augmenting the updated set of metadata with at least one additional data attribute from the new data; and
    persisting the augmented set of metadata in a networked repository.

2. The method of claim 1, further comprising receiving a third input of the plurality of inputs that relates to at least one data modeling attribute.

3. A computer system, comprising:
    a processor that is communicatively coupled to at least one server device via a network;
    an electronic device comprising a display configured to display a user interface; and
    at least one user input mechanism configured to receive a plurality of user inputs from the user interface;
    wherein the processor is configured to:
    display the user interface on the display;
    receive, via the user interface, a first input of the plurality of inputs that relates to at least one data attribute and at least one corresponding data attribute description, wherein the at least one data attribute includes information that specifies a type of data, a data identifier, a field length, a range definition, and a formatting specification;
    receive, via the user interface, a second input of the plurality of inputs that relates to at least one data quality rule, wherein the at least one data quality rule includes a first rule to identify a source of the data, a second rule to identify a time that the data was originally generated, and a third rule to identify an update interval for the data;
    use the received first input and the received second input to generate a set of metadata;
    use the at least one data quality rule to determine a plurality of certification metrics, wherein each of the plurality of certification metrics measures a degree of data quality with respect to the at least one data quality rule;
    filter data in a data warehouse with at least one subset of the generated set of metadata;
    generate new data from the filtered data, wherein the new data is compatible with the at least one data quality rule;
    determine a quality score for at least one subset of the new data by applying the plurality of certification metrics to the at least one subset of the new data;
    determine a composite quality score for the at least one subset of the new data by combining each of the corresponding plurality of certification metrics;

discard the at least one subpart of the new data when the corresponding composite quality score is below a certification metric threshold;

update the generated set of metadata based on the undiscarded new data;

augment the updated set of metadata with at least one additional data attribute from the new data; and persist the augmented set of metadata in a networked repository.

4. The computer system of claim 3, wherein the processor is further configured to receive a third input of the plurality of inputs that relates to at least one data modeling attribute.

5. A non-transitory computer readable medium configured to store instructions, which when executed by a processor, cause a computing device to:

display a user interface on a display of an electronic device, the user interface configured to receive a plurality of inputs;

receive, via the user interface, a first input of the plurality of inputs that relates to at least one data attribute and at least one corresponding data attribute description, wherein the at least one data attribute includes information that specifies a type of data, a data identifier, a field length, a range definition, and a formatting specification;

receive, via the user interface, a second input of the plurality of inputs that relates to at least one data quality rule, wherein the at least one data quality rule includes a first rule to identify a source of the data, a second rule to identify a time that the data was originally generated, and a third rule to identify an update interval for the data;

use the received first input and the received second input to generate a set of metadata;

use the at least one data quality rule to determine a plurality of certification metrics, wherein each of the plurality of certification metrics measures a degree of data quality with respect to the at least one data quality rule;

filter data in a data warehouse with at least one subset of the generated set of metadata;

generate new data from the filtered data, wherein the new data is compatible with the at least one data quality rule;

determine a quality score for at least one subset of the new data by applying the plurality of certification metrics to the at least one subset of the new data;

determine a composite quality score for the at least one subset of the new data by combining each of the corresponding plurality of certification metrics;

discard the at least one subpart of the new data when the corresponding composite quality score is below a certification metric threshold;

update the generated set of metadata based on the undiscarded new data;

augment the updated set of metadata with at least one additional data attribute from the new data; and persist the augmented set of metadata in a networked repository.

6. The non-transitory computer readable medium of claim 5, wherein the instructions further cause the computing device to receive a third input of the plurality of inputs that relates to at least one data modeling attribute.

\* \* \* \* \*